United States Patent [19]

Kudriavetz

[11] 4,389,365

[45] Jun. 21, 1983

[54] METHOD AND APPARATUS FOR STRIPPING MOLDED ROUND ARTICLES FROM MOLD

[75] Inventor: Peter Kudriavetz, Mattapoisett, Mass.

[73] Assignee: Acushnet Company, New Bedford, Mass.

[21] Appl. No.: 217,522

[22] Filed: Dec. 17, 1980

[51] Int. Cl.³ .............................................. B29C 7/00
[52] U.S. Cl. ................................. 264/297.8; 264/334; 425/233; 425/405 R; 425/408; 425/436 R; 425/444
[58] Field of Search ... 425/436 RM, 436 R, DIG. 42, 425/DIG. 47, 408, 444, 405 R; 264/318, 334, 161, 163, 297, DIG. 67, 161, 163, 275, 276, 279.1, 325

[56] References Cited

U.S. PATENT DOCUMENTS

| 216,305 | 6/1879 | Brown | 425/808 |
|---|---|---|---|
| 277,809 | 5/1883 | Taylor | 425/808 |
| 1,405,998 | 2/1922 | Gammeter | 425/DIG. 42 |
| 2,376,085 | 5/1945 | Radford et al. | 264/275 |
| 2,392,459 | 1/1946 | Casalino | 425/806 R |
| 3,287,807 | 11/1966 | Menke | 425/408 |
| 4,047,864 | 9/1977 | De Santis | 425/408 |
| 4,178,003 | 12/1979 | Hobson | 425/DIG. 42 |

FOREIGN PATENT DOCUMENTS 721751  1/1955  United Kingdom ................ 264/326

Primary Examiner—James B. Lowe
Attorney, Agent, or Firm—Eyre, Mann, Lucas & Just

[57] ABSTRACT

An improvement in molding devices is disclosed which has particular application in the formation of round rubber objects. The cavity cups in one mold plate are made of greater than hemispherical dimension whereby all of the balls will remain in one of the plates when the plates are separated. A flash removal system is also disclosed.

11 Claims, 3 Drawing Figures

METHOD AND APPARATUS FOR STRIPPING MOLDED ROUND ARTICLES FROM MOLD

The present invention relates to the molding of rubber objects and is particularly concerned with the molding of spherical balls from elastomeric resins.

Rubber balls are frequently made by compression molding. In compression molding there are two mold plates, each of which has a plurality of cavities of hemispherical dimension. The composition to be molded is distributed in slugs in the bottom mold cavities. The mold plates are brought together under heat and pressure as a result of which the rubber expands and fills the spherical cavities of the opposed mold plates. Since it is undesirable to have any voids in the balls, there is usually employed a slight excess of material which is pressed out of the mold during the ball formation and becomes the well-known "flash". There is also frequently employed an overflow flash groove around the cavities to handle excess material.

When the balls are sufficiently cured in the mold, the mold plates are opened and the balls are removed therefrom. As is well-known, the balls have a tendency to stick in both the upper and lower mold plates as a result of which removal is quite difficult. If ejector pins are used for both the upper and lower mold plates, the balls falling from the top have a tendency to bounce around and fall out of the mold where the operator cannot get them easily. Furthermore, the balls will usually have portions of the flash hanging from various parts of the equator of the ball, which flash is somewhat difficult to remove.

The applicants have now discovered a relatively simple means for maintaining all of the balls in one of the mold plates. This facilitates removal of the balls by any means, but is especially useful in simultaneous removal of all balls by a vacuum means or the like, whereafter, the entire set of balls can be dropped onto a plate having holes which are slightly oversized with respect to the balls. As the balls pass through the plate by gravity, or alternatively under pressure, flash removal is effected.

These and other aspects of the present invention may be more fully understood with reference to the drawings wherein.

Figure 1:
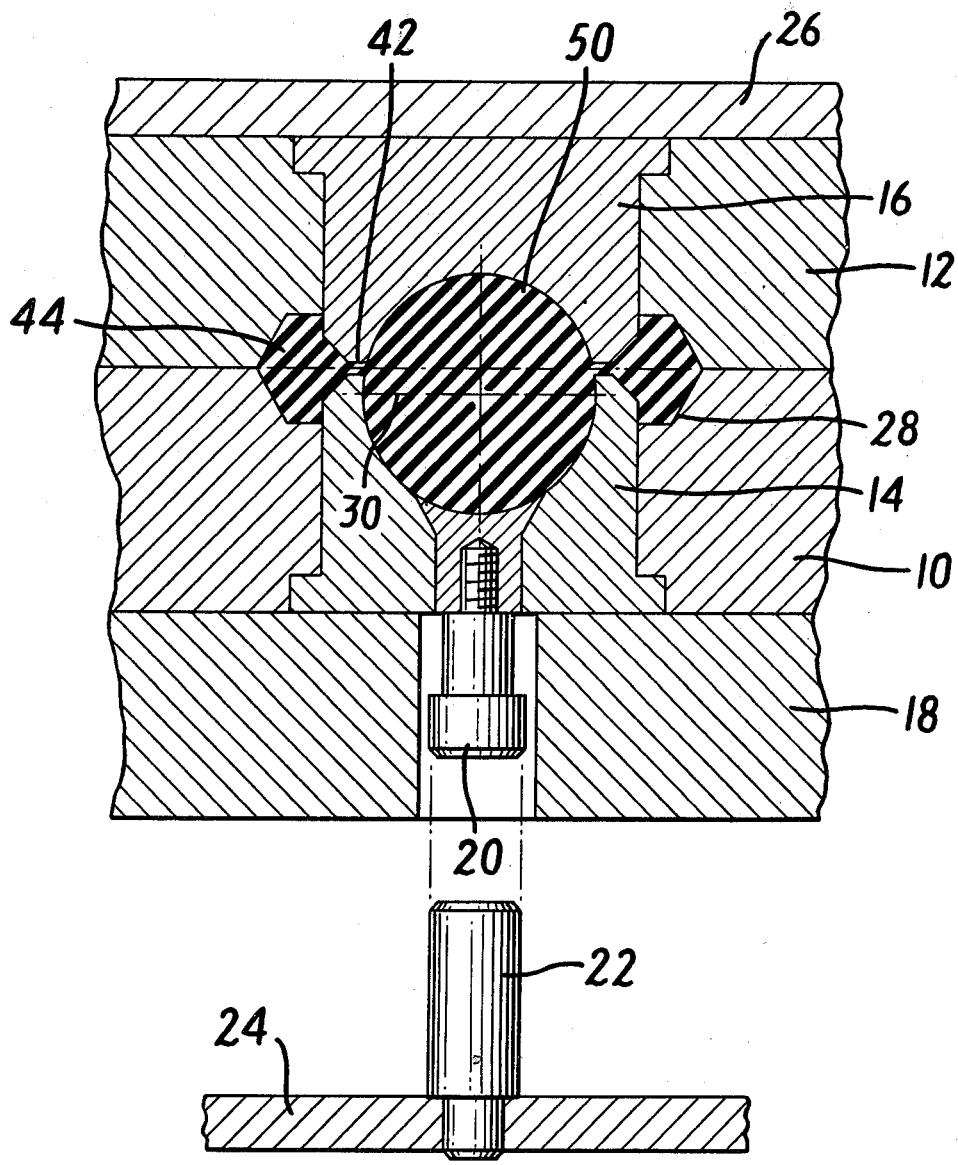
FIG. 1 shows a mold according to the present invention in closed position with a ball being formed therein.

Referring first to FIG. 1 there is shown a lower mold plate 10 and an upper mold plate 12 having a lower ball half mold 14 and an upper ball half mold 16. The mold plate 10 rests on a base 18 through which passes an ejector pin 20 activated by the ejector plate pin 22 of ejector plate 24. Ball half mold 16 is held in mold plate 12 by retaining plate 26. It will be appreciated that there are a number of ball half molds in each mold plate with only one thereof being shown in each. The molds are generally aligned in rows as in a muffin tin with from 20 to 200 or more being a typical number of molds per press. Passing around the molds are flash overflow grooves 28 and these flash overflow grooves normally interconnect throughout the mold plates as can be more clearly seen in FIG. 3.

As can be seen, the golf ball has a center line 30 through the middle thereof. This is normally the mold parting line. In accordance with the present invention the center line of the golf ball is not the mold parting line. Rather, the cavity of the lower ball half mold is a truncated sphere of greater than hemispherical dimension while the cavity of the upper ball half mold is a truncated sphere of less than hemispherical dimension. The cavity of the lower ball half mold thus has a cross-section at its top which is smaller in dimension than the greatest cross-section of the ball. When the mold plates are parted, the balls will all remain in the cavities in the lower ball molds. The balls can be removed from the lower ball mold by activation of the ejector plate, see FIG. 2.

The size of the opening at the top of the cavity of the lower ball mold is not critical. However, it is preferred that the mold cavity have a diameter at its opening of at least 0.5% less than the diameter of the widest part of the ball and preferably the mold has a cavity at its opening of at least 1% less than the diameter of the widest part of the ball. It is further preferred that the mold cavity not have a diameter at its opening which is greater than 10% less than the diameter of the widest part of the ball. For the range of 0.5%-10% where the object being formed is spherical, the cavity volume ratio will be from about 10:7 to about 5:2 between the lower and upper half molds (not necessarily respectively). The lower limit has been found to yield excellent retention of the balls in the lower mold plate while diameters above the upper limit frequently result in tearing of the product during removal. Obviously these values will vary depending upon the overall size of the mold, the nature of the product being made, the material being molded and its intended use. The important dimension for the top of the cavity of the lower mold is that it be of small enough dimension to retain substantially all of the balls when the mold plates open and of large enough dimension so that the product is not destroyed when it is ejected. In the latter connection, there are instances where there is no concern as to whether or not the product is torn somewhat during removal, e.g. when the balls are being used as loose filler in packaging applications.

Figure 2:
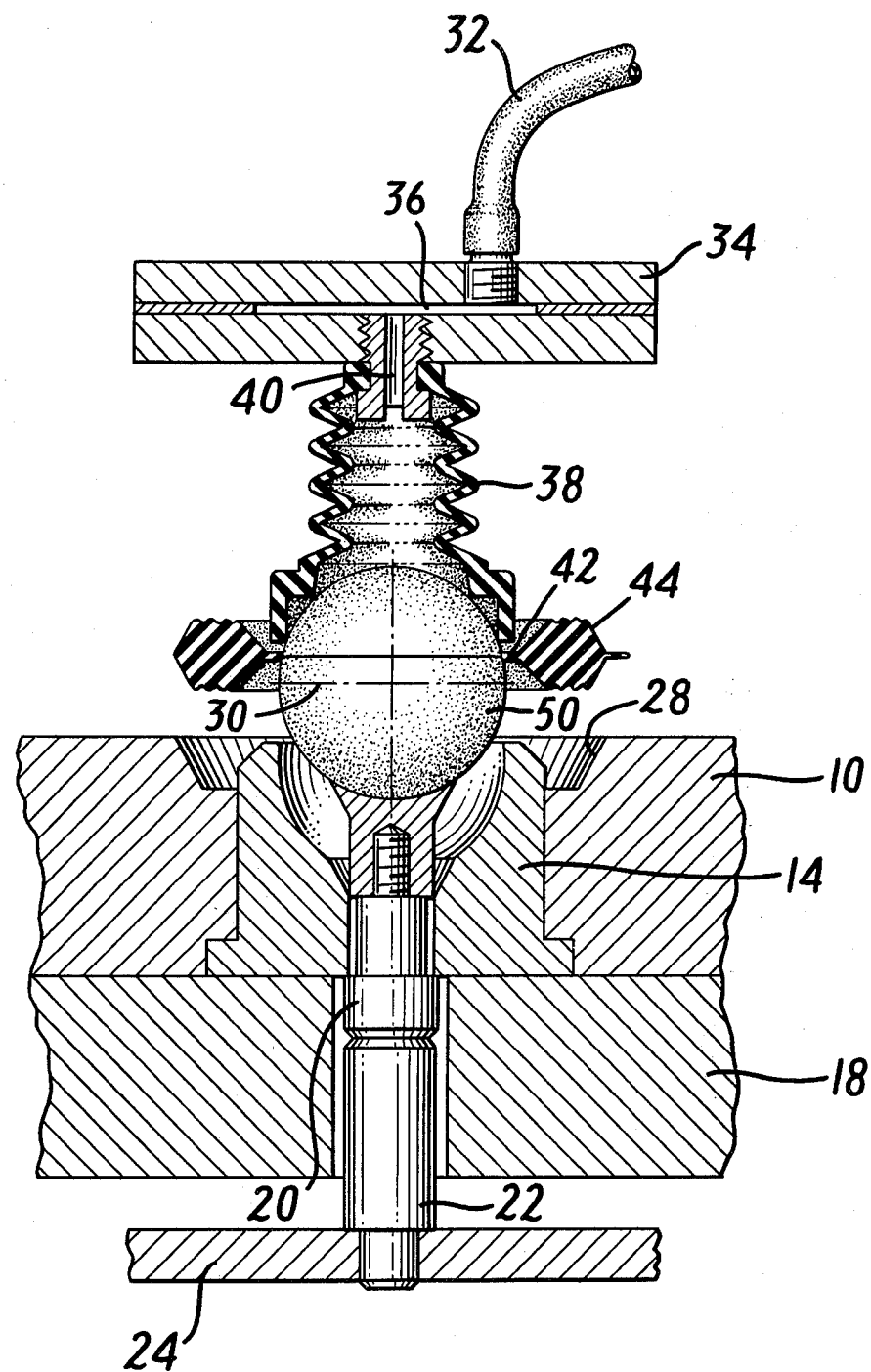
FIG. 2 shows the removal of the balls by vacuum means.

Turning to FIG. 2, there is shown a preferred method of ball removal according to the present invention employing a vacuum system. A vacuum line 32 is connected to a source of vacuum (not shown) and to a stripper plate 34 having a vacuum chamber 36 in open communication therewith.

The vacuum chamber 36 is in open communication with a convoluted rubber boot 38 through passage 40.

After the mold plates have been separated (upper mold plate not shown in FIG. 2), the vacuum stripper plate is brought into the mold over the lower mold plate 10. A boot 38 is provided for each ball in the lower mold plate. The vacuum stripper plate 34 is brought down towards the balls so that the boot 38 engages the balls. Vacuum is then achieved in vacuum chamber 36 through vacuum line 32 as a result of which the boots are snuggly brought down against the balls. As shown in the drawings, and as preferred, the boots are of convoluted rubber so that when vacuum is applied they will compress. This is advantageous in allowing for slight mispositioning of the boots 38 or slight misalignment between the vacuum stripper plate 34 and the upper mold plate 12.

After the vacuum is applied, ejector plate 24 is raised thereby raising in turn ejector plate pin 22, ejector pin 20 and the balls.

It will be apparent that the foregoing system, while preferred, is not essential. For example, the balls could be ejected before the stripper plate and boots are brought into position. Similarly, the stripper plate and boots could be brought into position above the balls but the balls could be ejected before any vacuum is applied. The particular method used will depend upon the tendency of the balls to fly about as they are ejected from the mold cavities. This in turn will depend upon the material of which the ball is made and the size of the opening at the top of the cavity. Obviously what is desired is to have each ball picked up by the negative pressure of its associated boot.

With all of the balls now firmly affixed to their respective boots of the vacuum apparatus by air pressure, the vacuum stripper plate is raised, carrying with it the balls. It is then removed from between the mold plates.

Figure 3:
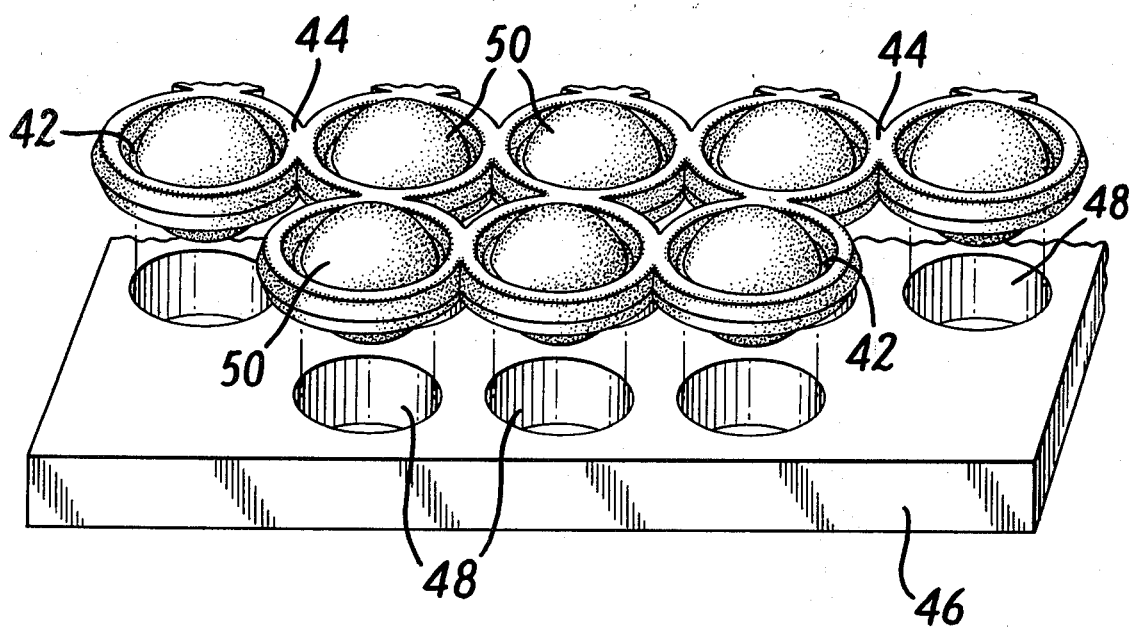
FIG. 3 shows flash removal.

Because of the simultaneous removal of all of the balls, the flash 42 and overflow flash 44 will be carried with the balls. As shown in FIG. 3, this feature can be utilized to facilitate removal of the flash. In FIG. 3 a plurality of balls 50 with inter-connected flash 42 and overflow flash 44 are positioned by the vacuum apparatus (not shown, for purposes of clarity) above a plate 46. The plate 46 has a plurality of holes 48 therein which correspond to the position of the balls 50. The holes 48 are preferably made slightly larger (up to about 10% greater diameter is suitable) than the diameter of the balls. The vacuum is suddenly cut off as a result of which the balls and flash fall toward the plate 46 under the force of gravity. As the balls drop through the holes 48 in the plate, they come out substantially free of overflow flash 44. Furthermore, a substantial amount of the flash 42 is normally removed and, in many applications, no separate deflashing operation is required.

As an alternative to the foregoing, the vacuum system can simply deposit the set of balls and flash on the plate 46 and the holes 48 can be made of slightly smaller dimension than the diameter of the balls. The balls can then be pushed through the plate 46 (means not shown) and in many instances this will effect even better flash removal. However, this system is limited to those cases where the material from which the ball is made is relatively resilient and deformable since in other cases the ball is likely to be torn or even destroyed when forced through a hole smaller than the diameter of the balls.

While preferred, the balls need not be removed by the vacuum system just described. The instant invention is advantageous even where manual removal is employed. Alternatively a frictional system can be employed by making the rubber boots somewhat larger so they squeeze down over and grip the ball. The balls can then be ejected from the boots by air pressure, ejector pins or the like. Other removal systems such as gripping fingers, needles, push rods (for horizontal unloading) of magnetic systems (for balls highly loaded with iron filings or the like) can also be employed.

It will also be appreciated that the oversized cavity mold need not be the lower mold but can rather be the upper mold. In this instance, the ejector pins would be in the upper mold plate and would eject the balls downward when the mold plates were parted. The balls can then be collected in a tray or the like. Alternatively a plate such as 46 can be inserted between the mold plates with a funnel-like device therebeneath. As the balls are ejected from the upper mold plate they will pass through the plate 46, thereby effecting flash removal and then into the collecting funnel from which they can be carried easily from the press.

While the present invention is primarily concerned with spherical objects, it will be appreciated that it can also be used with other objects, especially those with a smooth surface such as egg shaped products, cylindrical products wherein the parting line is along the length, candle-pin shaped objects and the like.

The materials from which the balls are made are not a part of the present invention. However, since the molds are rigid, e.g. brass, steel or the like, the ball must be at least somewhat deformable so that it can be ejected from the undercut opening of the lower mold. Suitable materials include natural and synthetic rubbers and other elastomeric materials such as polybutadiene, neoprene and the like.

It will be understood that the claims are intended to cover all changes and modifications of the preferred embodiments of the invention, herein chosen for the purpose of illustration, which do not constitute a departure from the spirit and scope of the invention.

What is claimed is:

1. A method of molding objects having a curved outer surface comprising:
    (a) forming said object in a mold device, said mold device comprising a first set of half molds positioned in a first mold plate and a second set of half molds positioned in a second mold plate, each said half mold in said first set having a cavity therein and each said half mold in said second set having a corresponding cavity which when placed together define the shape of said object and a mold parting line between the cavities, the cavity in each half mold of said first set having a cross-section at the mold parting line whose dimension is from about 0.5% to about 10% less than the dimension of the greatest cross-section of the object to be molded and forming thereby an undercut opening of said cavity,
    (b) separating said first mold plate from said second mold plate whereby each molded object is retained in the first set of half molds by the undercut opening thereof;
    (c) mechanically removing said molded object from said first set of half molds.

2. The method of claim 1 wherein said objects are spherical.

3. An apparatus for compression molding spherical objects comprising opposed mold plates, each said mold plate having a plurality of half molds therein, each said half mold having a cavity, the plates being movable towards and away from each other and, when together, the cavities of the said half molds of one plate being in registration with the cavities of the said half molds of the other plate, the cavity in each half mold in one of said plates being a portion of a sphere, said portion being a truncated sphere truncated at said mold parting line so as to be of greater than hemispherical dimension and the cavity in each half mold of the other plate being a corresponding remaining portion of said sphere truncated at said mold parting line to be of less than hemispherical dimension whereby said cavities in said one of said plates are undercut for retention of the molded spherical objects, and means for simultaneously mechanically releasing all said spherical objects from the half molds of said one mold plate.

4. The mold device of claim 1 wherein said objects are spherical objects and wherein the cavity in each half mold of said first set is a truncated sphere of greater than hemispherical dimension and the cavity in each half mold of the second said set is a corresponding truncated sphere of less than hemispherical dimension.

5. The mold of claim 4 wherein the ratio of volume of each cavity of said first set to the volume of each cavity of said second set is from about 10:7 to about 5:2.

6. The mold of claim 4 wherein the first of said sets is the lower half molds and the second said set is the upper half molds.

7. The mold of claim 4 wherein the first of said sets is the upper half molds and the second said set is the lower half molds.

8. The apparatus of claim 3 further comprising removing means for simultaneously removing said spherical objects from said one mold plate said removing means comprising a vacuum system with an individual vacuum applied to each said ball.

9. The apparatus of claim 8 wherein the said individual vacuum is applied through a boot which contacts the top of the ball.

10. The apparatus of claim 9 wherein the boot is a convoluted rubber boot.

11. A mold device for the production of objects having curved outer surface, said mold device comprising a first set of lower half molds positioned in a first mold plate and a second set of half molds positioned in a second mold plate, each said half mold having a cavity therein, the cavity of the corresponding half molds, when together, defining the shape of the object, the cavity in each half mold of said first set having a cross-section at the mold parting line of the mold halves whose dimension is in the range of approximately 0.5% to approximately 10% less than the dimension of the greatest cross-section of the object to be molded whereby upon separation of the mold plates the molded object will be retained in said first set of half molds by the undercut opening thereof, and said device further comprising means for mechanically removing each said object from each half mold of said first set.

* * * * *

UNITED STATES PATENT AND TRADEMARK OFFICE
CERTIFICATE OF CORRECTION

PATENT NO. : 4,389,365

DATED : June 21, 1983

INVENTORS : Peter KUDRIAVETZ

It is certified that error appears in the above-identified patent and that said Letters Patent is hereby corrected as shown below:

Column 4, line 67 (claim 4, line 1): replace the numeral "1" with --11--.

Signed and Sealed this

Twenty-eighth Day of September, 1999

Attest:

Q. TODD DICKINSON

*Attesting Officer*    Acting Commissioner of Patents and Trademarks